(12) United States Patent
Poessnecker et al.

(10) Patent No.: US 6,590,063 B2
(45) Date of Patent: Jul. 8, 2003

(54) LOW-MELTING COPOLYAMIDE AND THEIR USE AS HOT-MELT ADHESIVES

(75) Inventors: Gerhard Poessnecker, Trin (CH); Jürgen Spindler, Domat/EMS (CH); Eberhard Kinkelin, Chur (CH)

(73) Assignee: EMS-Chemie AG, Domat/EMS (CH)

( * ) Notice: Subject to any disclaimer, the term of this patent is extended or adjusted under 35 U.S.C. 154(b) by 0 days.

(21) Appl. No.: 09/852,218

(22) Filed: May 9, 2001

(65) Prior Publication Data
US 2002/0022670 A1 Feb. 21, 2002

(30) Foreign Application Priority Data
May 10, 2000 (DE) .......................... 100 22 701

(51) Int. Cl.$^7$ .......................... C08G 69/02; C08G 69/14
(52) U.S. Cl. .......................... 528/310; 528/323; 528/324; 528/332; 528/335; 528/338; 528/340; 526/935; 428/357; 428/392; 428/394; 428/395; 428/474.4
(58) Field of Search .......................... 528/310, 324, 528/323, 332, 335, 338, 340; 428/357, 392, 394, 395, 474.4; 526/935

(56) References Cited

U.S. PATENT DOCUMENTS

| | | | | |
|---|---|---|---|---|
| 3,515,702 A | * | 6/1970 | Raabe .................. | 528/310 |
| 3,933,762 A | * | 1/1976 | Naito et al. ............ | 528/310 |
| 4,012,365 A | * | 3/1977 | Moriyama et al. ....... | 528/310 |
| 4,102,871 A | * | 7/1978 | Horn et al. ............ | 528/324 |
| 5,081,222 A | * | 1/1992 | Reimann et al. ........ | 528/324 |
| 5,218,082 A | * | 6/1993 | Reimann et al. ........ | 528/339 |
| 5,298,595 A | * | 3/1994 | Reimann et al. ........ | 528/324 |
| 6,172,178 B1 | * | 1/2001 | Koning et al. .......... | 528/310 |
| 6,391,982 B1 | * | 5/2002 | Haeger et al. .......... | 525/417 |

FOREIGN PATENT DOCUMENTS

| | | |
|---|---|---|
| DE | 2 324159 | 11/1974 |
| DE | 3248776 A1 | 12/1984 |
| EP | 0 965 627 A1 | 12/1999 |

* cited by examiner

Primary Examiner—P. Hampton-Hightower
(74) Attorney, Agent, or Firm—Kinney & Lange, P.A.

(57) ABSTRACT

Copolyamides, consisting of polycondensation products of the following components: caprolactam 10 to 45 mol-%, laurolactam 30 to 55 mol-%, at least 2 dicarboxylic acids 20 to 50 mol-% of the following compounds, aliphatic α,ω-dicarboxylic acids with 6 up to 14 C atoms inclusively, terephthalic acid, isophthalic acid and 2,6-naphthalene dicarboxylic acid, wherein the content of aromatic dicarboxylic acids is lower than 10 mol-%, with reference to the allover amount of the above-mentioned components, which add up to 100 mol-%, a diamine mixture in an amount that is equimolar to that of the dicarboxylic acids, chosen from the group of the following substances, hexamethylene diamine, piperazine and/or 2-methyl-1,5-diaminopentane, wherein the molar content of hexa-methylene diamine is between 75 and 95 mol-% with reference to the diamine mixture.

The copolyamides according to the invention are used for the production of mono- and multifilaments, fibers, films and nets.

9 Claims, No Drawings

LOW-MELTING COPOLYAMIDE AND THEIR USE AS HOT-MELT ADHESIVES

BACKGROUND OF THE INVENTION

Hot-melt adhesives on the basis of aliphatic copolyamides for the production of bonds between interlining textiles and face fabrics which are resistant to washing and dry cleaning have been known for a long time and are extensively used on a world-wide scale. Such polyamides are for instance disclosed in DE-A 1594233. The desired temperatures of the molten mass of between 80 and 130° C. are adjusted by the additional combination of further ω-amino carboxylic acids and further polyamide formers like 6,6 salt, 6,9 salt, 6,10 salt and/or 6,12 salt in different amounts with the commonly used components caprolactam/ω-aminocapronic acid and laurolactam/ω-aminolauric acid.

The stickiness or adhesive power of the known polyamides in a molten state is sufficient to permit their use in the hot-melt sealing and bonding of textiles in the textile industry. They also show a good resistance to the solvents generally used in the dry cleaning of textiles and to the washing temperatures of up to approximately 80° C. generally used in the textile industry. This resistance greatly depends on a high content of laurolactam and/or 11-aminoundecanenic acid or dimer fatty acid, though. The higher the content of these basic components, the higher the resistance to high washing temperatures; but simultaneously, the melting temperature of the copolyamides also rises, which is not desirable. Therefore, the known copolyamides cannot be used for the hot-melt sealing of temperature-sensitive substrates like leather, temperature-sensitive fleeces, felts, velvet finishes and the like made of natural or synthetic fibers. In DE-A 2324160 and DE-A 2324159 a copolyamide containing great amounts of caprolactam and having a low melting temperature of below 115° C. was suggested as the solution to this problem. This copolyamide must contain 20 to 40 wt.-% caprolactam. This copolyamide is suitable for the holt-melt sealing of temperature-sensitive substrates and has good adhesive properties and a high resistance to dry cleaning agents despite low bonding temperatures. However, it is a drawback that the lower melting point results in a lower resistance to washing. This is confirmed by German Patent DE 37 30 504.

Practical work has shown that in order to reach a low melting point, the polyamide must contain at least two dicarboxylic acids as components, wherein part of the usual aliphatic dicarboxylic acids may be substituted by aromatic compounds. However, the proportion of aromatic diacid(s) must not be greater than 10 mol-% (in reference to the total amount of the formulation), as a further increase in the content of aromatic compounds results in products with a high glass-transition temperature (Tg), which do not crystallize any more and remain completely amorphous. Such substances are mostly unsuitable as hot-melt adhesives, since they display a bad resistance to washing and dry cleaning.

On the other hand, many applications also require the hot-melt adhesive to remain workable for some time after application. This is often the case in direct laminating, where a certain time elapses between the application of the adhesive and the laminating and the adhesive should not lose its adhesive properties in the meantime.

The time-span within which the adhesive displays its adhesive properties is also often called "open time" among those skilled in the art.

According to the definition by ASTM Standard D 4497-85 the open time corresponds to the time available between the application of the adhesive on the first substrate and the bonding with the second substrate, wherein the force required for separating the layers again must still amount to 50% of the overall value.

Classic ternary copolyamides and their uses as hot-melt adhesives are described in DE-A 2204492. These substances show rather good textile properties regarding resistance to washing and dry cleaning, but they have the disadvantage of a relatively high melting point, which rules out fabric-protecting, energy-saving bonding.

The German patents DE 2324159 and DE 2324160 describe low-melting copolyamides. However, due to the low melting point, these have a reduced resistance to washing.

Also in the German laid open application DE-A 3248776 low-melting copolyamides are described. These are especially suitable for bonding with siliconized outer textiles and contain $C_{6-12}$ diamines in addition to lactams and $C_{6-12}$ dicarboxylic acids, wherein at least 30% of these diamines consist of single-branched aliphatic diamines with 6 carbon atoms.

Further hot-melt adhesives with a clearly higher content of additional diamines (in addition to hexamethylene diamine) are also described in the literature. Thus DE-A 2509791 mentions copolyamides with at least 70 mol-% diamines with at least one secondary amino group.

The copolyamides described there are above all used in the furniture industry for the veneering of edges.

Finally, the European patent EP 0 965 627 describes copolyamides with a very long open time. However, the compounds described there do not offer any resistance to dry cleaning.

It is therefore the object of the present invention to provide new low-melting copolyamides which can be used as hot-melt adhesives and display a good resistance to washing and dry cleaning and have a prolonged open time.

BRIEF SUMMARY OF THE INVENTION

The present invention relates to novel low-melting copolyamides consisting of at least six components, which can be preferably used as hot-melt adhesives for textiles and for technical applications.

DETAILED DESCRIPTION

This object is solved by the copolyamides according to claim 1 and their uses according to claims 8 and 9.

The subclaims contain advantageous embodiments of the invention.

The subject of the invention are copolyamides with the following contents:

| | |
|---|---|
| caprolactam | 10 to 45 mol-% |
| laurolactam and/or 12-aminododecanenic acid | 30 to 55 mol-% |
| at least 2 dicarboxylic acids | 20 to 50 mol-% | of the following compounds:
aliphatic α,ω-dicarboxylic acids with 6 to 14 carbon atoms inclusively, terepthalic acid, isophthalic acid and 2,6-naphthalene carboxylic acid, wherein the content of aromatic dicarboxylic acids is lower than 10 mol-%, in reference to the allover amount of the above-mentioned components adding up to a total of 100 mol-%, an amount of a diamine mixture equimolar to that of the dicarboxylic acids, chosen from the group of the following substances:

hexamethylene diamine, piperazine and/or 2-methyl-1,5-diaminopentane, wherein the molar content of hexamethylene diamine in reference to the diamine mixture amounts to between 75 and 95 mol-%.

In addition to the above-mentioned components, the hot-melt adhesives according to the present invention may also contain usual stabilizers and chain regulators for the adjustment of viscosity. Such additives are known to the skilled person.

The copolyamides according to the present invention display the following features:

low melting point enabling a fabric-protecting and energy-saving bonding, very high resistance to dry cleaning, very high resistance to washing, long open time and therefore good bonding properties also in technical applications.

This prolongation of the open time is obtained in the case of the hot-melt adhesives of the present invention by the use of at least one additional diamine in addition to hexamethylene diamine. If small amounts of piperazine and/or 2-methylpentamethylene diamine (2-methyl-1,5-diaminopentane) are polymerized into the polymer, products with a greater longevity of their adhesive properties will be obtained. If piperazine is added, the effect even seems to be a little stronger.

The most surprising discovery is that the properties are greatly improved through the addition of small amounts of piperazine and/or 2-methyl-1,5-diaminopentane in addition to hexamethylene diamine. It was found that up to a maximum content of 25 mol-% referring to the diamine mixture, it is not only possible to prolong the open time, but also the resistance.

Surprisingly, this beneficial effect is diminished again if the content of piperazine and/or 2-methylpentamethylene diamine (2-methyl-1,5-diaminopentane) in the formulation is raised too high.

The use of piperazine as a component of copolyamides used as hot-melt adhesives is known as such.

German Patents DE 3730504 and DE 19512004 explicitly mention copolyamides with piperazine as a monomer. The amount of piperazine used in the copolyamides described there is much higher, however, and the copolyamides claimed are characterized by a rapid hardening or crystallization of the hot-melt adhesive, which means that the open time is very short.

Therefore, the copolyamides of the present invention as described here have the advantage of the long open time as compared to the substances available in the state of the art. Furthermore, they are also more cost-effective due to the lower concentration of additional diamines.

The 2-methyl-1,5-diaminopentane used is a commercially available mixture of isomers (the product Dytek® by DUPONT company) containing 2-ethyl-1,4-diaminobutane as a side product.

The polyamides of the present invention are produced according to known processes, whereby the production process may be continuous or discontinuous. All components are statistically bonded to the polymer.

As already mentioned above, the open time is of decisive importance above all in technical bonding processes, in which the adhesive should be active for a certain time.

The copolyamides described show such a behavior.

Due to their properties, the substances can preferably be used as hot-melt adhesives in the form of granules or powder, but their adhesive properties can also be used in films, nets, fibers or filaments produced from the polymer.

EXAMPLES

The statistical copolyamides listed below were synthesized through hydrolytic polycondensation of the individual monomer components.

| monomers [mol-%]* | example A | example B | Example C | comparative example 1 | comparative example 2 | comparative example 3 |
|---|---|---|---|---|---|---|
| caprolactam | 30 | 25 | 27 | 30 | 30 | 40 |
| laurolactam | 40 | 50 | 40 | 50 | 40 | 40 |
| adipic acid | 10 | — | 3 | — | — | 20 |
| azelaic acid | 10 | — | 11 | — | 15 | — |
| sebacic acid | 10 | 19 | 10 | — | 15 | — |
| dodecane diacid | — | — | — | 20 | — | — |
| terephthalic acid | — | 6 | 9 | — | — | — |
| hexamethylene diamine | 25 | 20 | 25 | — | — | 20 |
| piperazine | 5 | — | — | 20 | — | — |
| 2-methylpentane diamine | — | 5 | 8 | — | 30 | — |
| relative viscosity (0.5% in m-cresol) | 1.37 | 1.36 | 1.34 | 1.41 | 1.38 | 1.35 |
| melting point/[° C.] (according to DIN 53765) | 104 | 100 | 79 | 113 | 109 | 121 |

*The sum of both lactams and the diacids is 100 mol-%. The amount of diamine is equimolar to that of the diacids.

For the analysis of their technical application properties the polymers were ground by means of a commercially available cold grinding device.

The fraction of 80 to 200 μm was sieved off and used for powder-dot coatings with a CP-52 engraved printing roller.

The coating was applied on a cotton interlining fabric.

The coating weight was adjusted to 13±1 g per square meter.

The samples were pressed together with the following face fabrics at temperatures of between 100 and 130° C.: PES/Wo 55/45 (polyester-wool blend (55/45 w/w %).

In order to measure the adhesion strength on textiles, thus bonded together textile strips of a width of 5 cm were mounted in a traction machine.

The examination parameters remained the same in all measurements taken:

| test speed: | 100 mm/min |
|---|---|
| width of the test object: | 50 mm |
| test path: | 80 mm |
| bias force: | 0N |
| test temperature: | 25° C. |

The following table shows the adhesion forces for the copolyamides A to C produced according to the invention and those of the comparative examples 1 to 3.

The annotations therein mean the following:

| [N/5 cm] | A | B | C | 1 | 2 | 3 |
|---|---|---|---|---|---|---|
| T = 100° C. | | | | | | |
| OB | 6.5 | 7.8 | 10 | 3.0 | 3.5 | 0.5 |
| 40° C. | 5.5 | 6.9 | 7.0 | 1.3 | 1.4 | 0 |
| DC | 6.3 | 7.5 | 9.0 | 2.0 | 2.0 | 0 |
| T =110° C. | | | | | | |
| OB | 8.5 | 10 | 13.5 | 4.5 | 6.8 | 1.9 |
| 40° C. | 7.7 | 9.4 | 11.0 | 2.8 | 4.4 | 0 |
| DC | 8.5 | 9.5 | 12.5 | 4.0 | 6.0 | 0.5 |
| T = 120° C. | | | | | | |
| OB | 11 | 13 | 16 | 7.5 | 10 | 4.0 |
| 40° C. | 9.5 | 11 | 13 | 5.0 | 7.5 | 1.9 |
| DC | 10 | 13 | 14.5 | 6.0 | 8.1 | 2.5 |
| T = 130° C. | | | | | | |
| OB | 13 | 15 | 18 | 10 | 13 | 7.5 |
| 40° C. | 11 | 13 | 16 | 8.2 | 9.6 | 5.0 |
| DC | 13 | 14 | 16.5 | 9.1 | 11 | 5.0 |

OB: original bonding
40° C.: adhesion after washing at 40° C.
DC: adhesion after dry cleaning
T: bonding temperature
Unit used for the separation force of the individual copolyamides on polyester/wool: [N/5 cm]

The open time was measured according to ASTM D 4497-85.

As the first substrate a dense PES knitted fabric was used; as the second substrate a pure wool fabric was used.

Measurements were taken at 140° C. and at 170° C.
The load used was 100 g.
Open time according to ASTM D 4497-85

| | A | B | C | 1 | 2 | 3 |
|---|---|---|---|---|---|---|
| T = 140° C. | | | | | | |
| open time/[s] | 60 | 50 | 60 | 10 | 120 | 20 |
| thickness of layer/[μm] | 520 | 600 | 550 | 610 | 540 | 570 |
| T =170° C. | | | | | | |
| open time/[s] | 70 | 50 | 70 | 20 | 30 | 20 |
| thickness of layer/[μm] | 70 | 520 | 530 | 480 | 490 | 580 |

Although the present invention has been described with reference to preferred embodiments, workers skilled in the art will recognize that changes may be made in form and detail without departing from the spirit and scope of the invention.

What is claimed is:

1. A copolyamide comprising:

10 to 45 mol-% caprolactam;

30 to 55 mol-% laurolactam;

20 to 50 mol-% of at least two dicarboxylic acids, the dicarboxylic acids being aliphatic α,ω-dicarboxylic acids with 6 up to 14 C atoms inclusively, terephthalic acid, isophthalic acid, or 2,6-naphthalene dicarboxylic acid, wherein the content of aromatic dicarboxylic acids is lower than 10 mol-%, with reference to the overall amount of the above-mentioned components, which add up to 100 mol-%; and a diamine mixture in an amount that is equimolar to that of the dicarboxylic acids, the diamine mixture being hexamethylene diamine, piperazine, or 2-methyl-1,5-diaminopentane, wherein the molar content of the hexamethylene diamine is between 75 and 95 mol-% with reference to the diamine mixture.

2. The copolyamide according to claim 1 and further comprising:

15 to 40 mol-% of the caprolactam;

30 to 45 mol-% of either the laurolactam, or 12-amino dodecanenic acid;

20 to 40-% of the at least 2 dicarboxylic acids; and the diamine mixture in an amount that is equimolar to that of the dicarboxylic acids, wherein the molar content of hexamethylene diamine is between 80 and 95 mol-% with reference to the diamine mixture.

3. The copolyamide according to claim 1 wherein the amount of the diamine mixture is equimolar to that of the dicarboxylic acids, the diamine mixture including the hexamethylene diamine and the piperazine, wherein the molar content of the hexamethylene diamine is between 75 and 95 mol-% with reference to the diamine mixture.

4. The copolyamide according to claim 1 wherein a melting point of the copolyamide measured in accordance with DIN 53765 is lower than 120° C. (peak maximum).

5. The copolyamide according to claim 1 wherein the melting point of the copolyamide measured in accordance with DIN 53765 is lower than 100° C. (peak maximum).

6. The copolyamide according to claim 1 wherein the melting point of the copolyamide measured in accordance with DIN 53765 is lower than 90° C. (peak maximum).

7. The copolyamide according to claim 1 wherein the 2-methyl-1,5-diaminopentane used is a mixture of isomers, which contains 2-ethyl-1,4-diaminobutane as a side product.

8. The copolyamide according to claim 1 used as hot-melt adhesives.

9. The copolyamide according to claim 1 used for the production of mono- and multi-filaments, fibers, films and nets.

* * * * *

UNITED STATES PATENT AND TRADEMARK OFFICE
CERTIFICATE OF CORRECTION

PATENT NO. : 6,590,063 B2
DATED : July 8, 2003
INVENTOR(S) : Gerhard Possnecker et al.

It is certified that error appears in the above-identified patent and that said Letters Patent is hereby corrected as shown below:

Column 1,
Line 16, delete "componets" and insert -- components --.
Line 36, delete ".".

Column 4,
Line 64, delete "meter" and insert -- metre --.

Column 5,
Line 57, delete "120" and insert -- 20 --.
Line 62, delete "70" and insert -- 470 --.

Signed and Sealed this

Sixth Day of September, 2005

JON W. DUDAS
*Director of the United States Patent and Trademark Office*